United States Patent [19]

Emerson et al.

[11] 4,141,750

[45] Feb. 27, 1979

[54] AMMONIA CONTAINING ROSIN SIZES

[75] Inventors: Ralph W. Emerson, Boston, Mass.; Jerome L. Martin, Terre Haute, Ind.

[73] Assignee: The Plasmine Corporation, Portland, Me.

[21] Appl. No.: 812,328

[22] Filed: Jul. 1, 1977

[51] Int. Cl.² ............................................. C08L 93/04
[52] U.S. Cl. ..................................... 106/218; 106/236
[58] Field of Search ....................... 106/218; 162/180; 260/96.5, 503, 505 N; 428/498

[56] References Cited

U.S. PATENT DOCUMENTS

| | | | |
|---|---|---|---|
| 2,273,940 | 2/1942 | Dimroth et al. | 260/555 |
| 2,684,300 | 7/1954 | Wilson | 162/180 |
| 2,729,637 | 1/1956 | Gable et al. | 544/192 |
| 2,941,919 | 6/1960 | Watkins | 162/180 |
| 2,956,956 | 10/1960 | Strauss et al. | 260/503 |
| 3,906,142 | 9/1975 | Dowthwaite | 428/498 |
| 4,022,634 | 5/1977 | Emerson et al. | 106/218 |

OTHER PUBLICATIONS

Chem. Abst., 51:7012j.
Chem. Abst., 37:5941, 1943.
Chem. Abst., 41:710,711, 1947.
Berlstems Handbook, 4th Edition, vol. 3 (1961), pp. 80–109.
*Journal of Chemical Society*, vol. 146, pp. 603–616 (1943), Some Properties of Urea, Biuret and Triuret, Haworth et al.
Benchte, vol. 68, pp. 957–960, 1935, Warren et al.

*Primary Examiner*—Theodore Morris
*Attorney, Agent, or Firm*—Bernard & Brown

[57] ABSTRACT

Novel sizing compositions comprise an aqueous mixture of the reaction product of urea with selected Lewis acid, and a rosin that is modified with from about 5 to 50 percent based on the weight of the rosin, of an organic acidic compound selected from the group consisting of an α,β-unsaturated organic acid, an anhydride thereof, and their mixtures. The selected Lewis acids which can be employed are sulfuryl chloride, chlorosulfonic acid, thionyl chloride, benzenesulfonyl chloride, benzenesulfonic acid, ortho- or para-toluenesulfonyl chloride, and ortho- or para-toluenesulfonic acid. Methods for making the sizing compositions and paper which is sized with the sizing compositions are also disclosed.

39 Claims, No Drawings

AMMONIA CONTAINING ROSIN SIZES

This invention relates to novel sizing compositions containing ammonia, ammonium salts, reaction products of urea with selected Lewis acids and specially modified rosin, to methods for making the compositions and to paper products sized with the compositions.

Cellulosic products — paper, rigid paper, paperboard, molded products, and the like — basically are produced by applying a dilute suspension or solution of fibers in an aqueous medium onto a fine mesh screen through which the aqueous medium drains, leaving a thin mat of fibers. The mat is removed from the screen, further liquid is expressed and the sheet is dried to form the desired product. The fibrous raw materials used in this process are generally one or more of these several types of commercially available pulps. These pulps include mechanical pulps, or groundwoods, bleached or unbleached, and chemical pulps, for example bleached, unbleached, and semi-bleached sulfate and sulfite pulps, as well as semi-chemical pulps. Other fibrous constituents used as the fibrous paper and paperboard-making raw materials include reclaimed waste papers, cotton fibers, inorganic and synthetic organic fibers, and mixtures of these materials.

The first step in paper product manufacture is pulp stock preparation. Pulps are most conveniently handled in the form of slurry to facilitate their mechanical treatment, non-fibrous additive mixing, and their delivery to the paper machine. Pulps are fed to the paper mill in a slurry directly from the pulping operation where both the pulping and paper-making are performed at the same location; otherwise, they are received as dry sheets or laps, and must be slushed before use. Slushing separates the fibers and disperses them in the aqueous medium with minimum detrimental mechanical effect so as to produce a consistently uniform starting material. The pulp slush or slurry is subjected to mechanical action known as beating or refining before being formed into a paper sheet. During refining, the fibers are swollen, cut, macerated, and frayed controllably to produce smaller fibrillar elements and to thereby desirably affect the physical properties of the resulting end product. Unbeaten pulp produces a light, fluffy, weak paper, whereas well-beaten pulp yields stronger, denser paper. During the beating or refining process, many non-fibrous materials are added to the pulp solution. Among these are mineral pigments for filling and loading, such as kaolin, titanium dioxide, calcium carbonate, and other well known filling materials, coloring additives and dyes, sizing agents, and other known beater additives.

After the pulp slurry has been beaten and refined and the additives mixed into it, this pulp slurry or "furnish" is delivered to continuous sheet forming equipment, such as a cylinder machine or a Fourdrinier, where it is discharged onto fine mesh screen through which the liquid carrier or aqueous medium drains and on which a fibrous mat is formed. This fibrous mat or sheet contains, for example, about 80% water when it leaves the screening and is therefore passed through one or more rotary presses for more water removal and is subsequently passed through a drying system, for example, steam-heated rotating cylinders, to yield the finished product. Molded pulp products are made on different equipment by a similar process designed to form, dry and press individual molded items such as paper plates and the like.

The sizing agents, as mentioned, are added to the paper-making process pulp slurry so as to render the finished product resistance to liquid penetration. In the alternative, the sizing agents may be excluded from the pulp additives, and may be applied to the paper after it is dried with very effective penetration resistance. In this method, the dry sheet is passed through a size solution or over a roll wetted with a size solution. Such sheets are "tub sized" or "surface sized".

Among the materials currently used as sizing agents are rosin, various hydrocarbon and natural waxes, starches, glues, casein, asphalt emulsions, synthetic resins, and cellulose derivatives. Rosin is one of the most widely used and most effective sizing agents. Extracted rosin is often partially saponified with caustic soda, and processed to yield a thick paste of 70 to 80% solids, of which up to 30 to 40% is free unsaponified rosin. Dry rosin and completely saponified rosin are also used as sizing agents. Any of these rosins may further be modified, for example, by the addition of maleic anhydride or other supplement. At the paper mill, the rosin paste is dissolved or emulsified by diluting it to about 15% solids with hot water and then further diluting it with cold water under vigorous agitation to 5% solids or less. This solution or emulsion is either used for surface sizing or is added to the stock, for example 0.1 or 0.5 to 4.0% size based on dry fiber, usually before, but sometimes simultaneously with, for example, one to three times as much aluminum sulfate (papermakers alum) is added. The aluminum sulfate is believed to form an ionically charged precipitant with the rosin size which is attracted to oppositely charged fiber.

Sizing compositions comprising an aqueous mixture of ammonia, an ammonium salt, and rosin that is modified with from about 5 to 50 percent based on weight of the rosin, of an organic acidic compound consisting of an $\alpha,\beta$-unsaturated organic acid, an anhydride thereof, and their mixtures, wherein ammonia and ammonium salt are provided by the reaction product of urea and an acid selected from the group consisting of sulfamic acid, phosphoric acid, oxalic acid, methanesulfonic acid, trichloroacetic acid, nitric acid, sulfuric acid, hydrochloric acid, and acetic acid, are disclosed in U.S. Pat. No. 4,022,634 to Emerson et al. While these sizing compositions have provided excellent results for pulp additive and surface sizing compositions, alternatives are sought.

It has now been discovered that novel sizing compositions can be produced which are more effective than the well known rosin types and are compatible with presently used pulp and stock material and additives. The novel sizing compositions contain a specially modified rosin, ammonia, an ammonium salt, and the reaction product of urea with at least one selected Lewis acid. These sizing compositions exhibit desirable sizing properties and various of the sizing compositions may exhibit acceptable sizing properties even when used in lesser amounts than those frequently employed using conventional sizing agents, thus enabling the user to meet existing standards with less sizing agent than heretofore required, and, therefore, at a lower cost. The products resulting from the use of the sizing compositions of this invention can be brighter and stronger than those produced by the heretofore available sizing agents. The novel sizing compositions also assist in the drying of the sheet when employed as a pulp additive so that the paper forming machine may be speeded up to produce a sheet of the same moisture content. Alternatively, more water may be added to the pulp stock to give the fiber on the paper machine wire a better orientation, thereby producing a stronger paper with superior formation. The novel sizing compositions are normally employed alone as a sizing agent with papermaker's alum in pulp stock or in surface sizing, but may be combined with commercially known sizing agents to replace a substantial part of those known agents.

The novel sizing compositions comprise aqueous mixture of ammonia, and ammonium salt, the reaction product of urea with selected Lewis acids, and a rosin that is modified with from about 5 to 50, preferably from about 9 or 10 to 20 or 30, percent, based on the weight of the rosin, of an organic acidic compound selected from the group consisting of an $\alpha,\beta$-unsaturated organic acid, an anhydride thereof, and their mixtures. While the urea-Lewis acid reaction product may in part provide ammonia and an ammonium salt other reaction products are produced which are essential in providing the advantageous properties of the sizing compositions of this invention.

Generally, in an embodiment of the sizing compositions of the present invention the product is prepared in a multistep method in which a first component reaction product is formed by reacting urea with at least one certain Lewis acid, a second component soap is formed by modifying rosin with an organic acidic compound and either before, during, or after modification, is saponified, and a final product, the sizing composition, is formed by mixing the two components.

To form the first component reaction product, the urea and at least one Lewis acid selected from the group consisting of sulfuryl chloride, chlorosulfonic acid, thionyl chloride, benzenesulfonyl chloride, benzenesulfonic acid, ortho- or para-toluenesulfonyl chloride, and ortho- or para-toluene-sulfonic acid are mixed together and reacted. The preferred Lewis acids are sulfuryl chloride, chlorosulfonic acid, benzenesulfonyl chloride and benzenesulfonic acid, and the most preferred acids are ortho- or para-toluenesulfonyl chloride and ortho- or para-toluenesulfonic acid. Water may be included in the mixture of urea and the lewis acid. If water is used it is advantageously included in amounts, parts by weight, equal to the urea plus Lewis acid, although urea may be reacted with the Lewis acid using water in excess of equal parts, or with little water or without water. If the Lewis acid is a solid, the reaction with urea may be carried out at a temperature somewhat above the melting point of the acid.

The urea is generally reacted with the Lewis acid at a temperature sufficient to cause a change in the pH of the mixture from an acidic pH to a basic pH as determined by a pH meter. This temperature will generally range from about 100° C. to 215° C. and is dependent to some extent upon the water content of the mixture, and may generally be higher for mixtures having a low water content.

Although the pH change is an important indication that the urea-acid reaction is complete, a more important consideration is the total acidity of the first component reaction product. This total acidity is measured as the amount of sodium hydroxide, expressed as the equivalent parts by weight of calcium carbonate, required to impart a pink color to a million parts of a phenolphthalein-containing, 50 weight percent, aqueous solution of the reaction product, and may be determined by use of the Hach Chemical Company Total Acidity Test (Hach Chemical Co., Ames, Iowa, Model AC-5 Acidity Test Kit). When the acid is reacted with the urea, ammonia and an ammonium salt are produced and this reaction not only raises the pH but also affects the total acidity of the mixture. Although it is not fully understood, this higher acidity (higher than pure urea) is believed to account for the ultimate superior sizing composition, i.e., agent, obtained. Thus, the amount of acid to urea is an important aspect, and is best defined in terms of the resulting total acidity (ppm) which it creates. The desired minimum total acidity is at least about 1,000 parts per million, and is preferably at least about 4,000 ppm. The actual amount of acid reacted with the urea is generally at least about 0.1 percent, and preferably from about 0.2 to about 8 percent, based on the weight of the urea, although more may be used, e.g., 15 or 20 percent acid based on the weight of the urea, to achieve the desired results.

Reaction of the urea with the acid is preferably, but not necessarily, conducted out of the presence of the rosin and the organic acidic compound. If desired, however, the urea can be reacted with the Lewis acid while in admixture with the modified rosin, as more fully discussed hereinafter.

Optionally, amounts of additional ammonia, up to about 6 percent by weight of the total mixture of ammonia, water and urea-acid reaction product may be added to the mixture of the urea-acid reaction product and water after it has cooled to room temperature to enhance the sizing results achieved upon combination with the specially modified rosin. For example, 20 parts of 29% aqueous ammonia are mixed at room temperature with 80 parts of the mixture of the urea-acid reaction product and water. This mixture is then combined with the modified rosin, as more fully discussed hereinafter.

In another embodiment, an additional ammonium salt is combined with urea and a Lewis acid selected from the group consisting of sulfuryl chloride, chlorosulfonic acid, thionyl chloride, benzenesulfonyl chloride, benzenesulfonic acid, p- or o-toluenesulfonyl chloride, and p- or o-toluenesulfonic acid to provide sizing agents of the present invention. The additional ammonium salt is in addition to the ammonium salt produced by the reaction between urea and the selected Lewis acids of this invention, and at least essentially the entire amount, e.g., at least about 90 weight percent of the ammonium salt provided through reaction with urea with an acid, is advantageously provided by reaction with the selected Lewis acids of this invention. The proportion on a weight basis of the urea to the additional ammonium salt, if employed, may often range from about 2 to 1 to about 1 to 4, and preferably is about 1 to 1 to 1 to 4. This reaction product first component may then be combined with modified rosin in place of the urea-acid reaction product to yield a sizing agent.

The additional ammonium salt component of the present invention may be the salt of an ammonium salt producing acid which reacts with ammonia to produce an ammonium salt such as, for instance sulfamic acid, chlorosulfonic acid, phosphoric acid, oxalic acid, p-toluenesulfonic acid, trichloroacetic acid, hydrochloric acid, sulfuric acid, methanesulfonic acid, nitric acid, stearic acid, acetic acid and sulfuryl chloride. Solid ammonium salts may be used or alternatively the salt may be formed by reaction of the desired acid with ammonia. Thus, for example, dry powders of ammonium sulfate, urea, and chlorosulfonic acid are heated together to about 160° C. at which temperature the mixture goes from an acid pH to an alkaline pH of about 8.

In forming the second component of the sizing compositions, the modified rosin, rosin is modified with an α,β-unsaturated organic acid, e.g., an α,β-unsaturated aliphatic acid generally containing from about 3 to 10, preferably from about 3 to 6 carbon atoms, or its anhydride, and mixtures thereof, as for example, acrylic acid, maleic acid, maleic anhydride, and fumaric acid.

Rosin is a mixture or resin acids (including abietic, pimaric, and levopimaric acids), hydrocarbons and high molecular weight alchols, which is obtained from any of three sources. Gum rosin is the residue remaining after distillation of turpentine oil from crude turpentine oleoresin obtained from living pine trees, wood rosin is the residue remaining after distilling off volatile fractions of the solvent extraction product (usually using naphtha as the solvent) from pine stumps, and tall oil rosin is a by-product in the fractionation of tall oil (an oily mixture of rosin acids, fatty acids and neutral materials obtained from the acid treatment of spent black liquor from paper and pulping processes). All three types are very similar chemically, except that tall oil rosin often contains 1 to 5% fatty acids remaining after fractionation, whereas gum rosin and wood rosin do not. As mentioned above, rosin may be used in sizing agents in "dry" form, or may be partially or completely saponified. In the sizing compositions of the present invention, gum rosin, wood rosin, tall oil rosin, or their mixtures, may be used. Tall oil rosin is preferred, however, as it generally produces the best results, possibly due to the presence of the fatty acids in it, although this is not fully understood.

As mentioned, the organic acidic compounds which may be used in modifying the rosin are α,β-unsaturated organic acids and anhydrides and their mixtures. Amounts of the organic acidic compound used to achieve the desired results generally range from about 5 to 50 percent or more, based on the weight of rosin, but preferably from about 9 to 30 percent is used, particularly about 15 percent. The modified rosin is formed into a soap by known methods, for example by adding sodium hydroxide or potassium hydroxide. However, the rosin may be saponified before, during or after it is modified. Saponification need not be complete, but is preferably sufficient to render the final sizing composition water soluble. With respect to the embodiment of the present invention comprising the reaction product of ammonia and modified rosin, ammonia is preferably used as the sole saponifying base.

To form the second component of the sizing composition, the rosin may be first melted, e.g., in a jacketed kettle, which is preferably covered and agitated to speed up the melting process. When the rosin is in hot liquid form, the organic acidic compound, in an amount as described above, may then be stirred in gradually as the rosin continues to be heated at just below its boiling point. When the organic acidic compound is added, a reaction occurs which raises the temperature of the mixture. It is preferred that the rosin be melted before addition of the organic acidic compound in order to make certain that the materials are reacted uniformly. The temperature is then held at a point above 100° C., and may go as high as about 180° C. or about 215° C. or 290° C., for at least about 30 minutes, preferably from about 30 minutes to about 4 hours to complete the modification of the rosin. This produces a dark brown, clear, syrupy mixture which will solidify if permitted to cool. After the rosin has been modified, the hot mixture may be poured into an aqueous solution of a saponifying base, e.g. sodium hydroxide and/or potassium hydroxide, under slow agitation to saponify the rosin if it has not already been saponified or is only partially saponified. The solution of saponifying base may advantageously contain from about 5 to about 35 percent of the base, based on the weight of the water. In a preferred method of making the sizing compositions of this invention, sufficient aqueous solution of saponifying base is used to produce an aqueous mixture of modified rosin soap containing from about 50 to about 70 weight percent solids, which mixture is preferably allowed to cool, and can be subsequently mixed with the reaction product of urea with a selected Lewis acid, or urea and a Lewis acid to provide the desired reaction product. Alternatively, however, the saponifying base may be added to the rosin before it is modified, or even during modification, to effect saponification.

While the formation of this second component has been described in terms of reacting an anhydrous mixture of molten rosin and the organic acidic compound, the second component may alternatively be formed by first mixing rosin with water and then adding the organic acidic compound. Thus, in the method of making the sizing agent of this invention, the second component may be formed in the presence of from 0 to about 60 percent, preferably from 0 to about 10 percent, water, based on the total weight of the rosin, the organic acidic compound and the water.

In mixing the reacted-urea first component with the modified rosin soap second component to form an embodiment of the novel sizing compositions, sufficient amounts are used to provide effective amounts for sizing, generally from about 25 to about 85 weight percent of the first component and from about 75 to about 15 weight percent of the second component based on their total dry weight in the sizing composition. This sizing composition generally contains at least about 25 weight percent, often about 40 to about 60 percent, water.

Preferably, this embodiment of the sizing compositions is formed by simply mixing the first component, and the second component at room temperature, but, less advantageously, they may be mixed and heated to the boiling point of the mixture to assure that all reactions are completed.

When the first component and the second component are mixed at an elevated temperature, the modified rosin may be heated to or kept at a temperature at which the mixing may be carried out. This mixing may comprise adding a diluted mixture of first component reaction product, which is heated, to the heated second component for chemical and physical mixing. The mixture of first and second components is heated at above 100° C. to boil off the water, and is preferably kept at the boil-off temperature until the cloudy solution becomes clear. Optionally, after the mixing is completed, very small amounts of ammonium hydroxide may be employed to adjust the pH of the product back to greater than 7 if it has dropped below 7. Amounts of ammonium hydroxide, up to 0.05 percent by weight of the mixture, will generally raise the pH to the desired range. The selection of first component and second component dilution concentrations is dependent on the desired relative amounts of reacted urea to modified rosin and on the desired concentration of the resulting sizing compositions. The choice of mixing temperatures employed is a function of the workability and of the desired degree of chemical and physical mixing, although in this embodiment, temperatures of at least 350° C. may prevent precipitation on mixing.

In another method of mixing the first and second components of the sizing composition, the first component reaction product may be mixed with enough aqueous solution of saponifying base to achieve a pH of about 10 to 12, and the resulting mixture then added to a hot mixture of second component, a modified unsaponified rosin, as described above, to perform the saponification and to produce the novel sizing composition. Alternatively, the reaction product-saponifying base water mixture may be added to a modified, unsaponified resin mixture which has been cooled to room temperature and diluted by the addition of water to produce the desired product.

In another method of mixing the first and second components, the rosin may be melted and mixed with the organic acidic compound as described under heat, and preferred proportions of urea and acid, or of urea, acid, and additional ammonium salt, added immediately after the rosin and organic acidic compound have melted together. This mixture is brought to the boiling point. The reaction of the urea and acid, or of urea, acid, and ammonium sulfate, described in the preferred process for the first component mixture occurs in the presence of the hot rosin-organic acidic compound mixture. Alternatively, a mixture of the urea and the acid, or of urea, acid, and ammonium sulfate, preferably premelted, is added to the hot reacted mixture of the rosin and the organic acidic compound. When the reaction is completed, the mixture is then saponified as previously described. Sizing results may be equally as good by following this procedure or that above in which the first and second components are formed separately, but this procedure wherein both components are formed in a single step is more difficult to control because the reactions proceed rapidly. It has been observed that when both components are formed in a single step, as here, the acid requirements in making the first component are somewhat reduced, although this is not completely understood.

If the sizing composition appears cloudy, it may be clarified by the addition of isopropanol or other clarification method used in the art, but is preferably clarified by the addition of ammonia which stabilizes the composition at low temperatures and enhances the properties of the sizing composition to achieve the desired clarification. For example, about 2% or less ammonia may be added to the composition, based on its total weight.

In another procedure, the urea-Lewis acid reaction product and the specially modified rosin or soap of the specially modified rosin may be mixed at room temperature to yield a sizing agent. The soap of the specially modified rosin may be prepared by pouring the hot mixture of the rosin and the organic acidic compound into an aqueous solution of a saponifying base, e.g., sodium hydroxide and/or potassium hydroxide, under slow agitation to saponify the modified rosin. Sufficient aqueous solution of the saponifying base is used to produce an aqueous mixture of modified rosin soap containing from about 50 to about 70 weight percent solids.

In a preferred embodiment, an ammonium salt in the sizing agent is produced in situ in the reaction of ammonia, rosin and organic acidic compounds. Ammonia may be combined with a soap of the specially modified rosin or preferably ammonia alone is used to saponify the rosin. It is believed that this reaction product is a mixture of the salts of ammonia with the resin acids in the rosin and of the organic acidic compounds used to modify the rosin. The sodium hydroxide, potassium hydroxide, or soda ash normally used to saponify rosin raises the pH to the alkaline pH of this invention but also reduces the total acidity below preferred levels unless the quantity used is closely controlled. When the specially modified rosin is saponified with ammonia and water alone, the product is a water soluble mix with the desired alkaline pH, generally a pH of about 9 or above.

Specially modified rosin must normally be melted to be saponified. When ammonia is used, however, the specially modified rosin will dissolve readily in water and ammonia at room temperature. In one method of saponification, the specially modified rosin is pulverized into water with high speed agitation. In a second method of saponification, water and ammonia are added under high speed agitation to melted specially modified rosin. It is preferred that aqueous ammonia be used, but alternatively ammonia gas may be bubbled through a melted specially modified rosin.

Although aqueous ammonia and specially modified rosin may be reacted at temperatures below boiling to produce good sizing results, it is preferred that these mixtures be boiled. Heating time can be controlled by measuring the pH of the mixture and, preferably, the mixture is agitated as it is heated. For example, a mixture boiled three minutes at a rapid boil reaches a pH of about 11.5 to about 11.7. If the rapid boiling is continued for an additional 2 to 3 minutes, the pH drops rapidly to the 9.4 to 9.6 range and the mixture loses its ammonia odor. Alternatively, a 20 to 30 minute slow simmer boil may be used to reduce the pH to the 8 to 9 range and the pH may then be raised to the preferred pH of about 9.2 to about 9.8, particularly 9.5, with sodium hydroxide or other alkaline material. After boiling, water is added to the mixture to replace the water and ammonia lost during boiling.

The amount of ammonia used depends upon whether or not ammonia is the sole saponifying agent used. When ammonia alone is used to saponify the specially modified rosin, about 10 percent to about 75 percent ammonia and from about 25 percent to about 90 percent rosin and organic acidic compound, based on the total weight of the ammonia and the rosin and organic acidic compound on a dry basis, are generally used to prepare the sizing agent. When ammonia is reacted with a soap of the specially modified rosin, the mixture is generally prepared with from about 4 percent to about 60 percent ammonia and from about 96 percent to about 40 percent rosin and organic acidic compound, based on the total weight of the ammonia and the rosin and organic acidic compound on a dry basis.

Based on the total weight of the ammonia, the ammonium salt, the reaction product between urea and at least one selected Lewis acid, and the rosin and the organic acidic compound on a dry basis, the sizing agent may be prepared to contain about 3 percent to about 30 percent ammonia, from about 4 percent to about 72 percent ammonium salt and from about 93 to about 25 percent rosin and organic acidic compound, usually the ratio of ammonium salt to ammonia is greater than about 1 to 1. The term "dry" is used throughout this specification to means exclusive of any water which is present. Alternatively, ammonia may be produced in situ by reaction between the rosin, the organic acidic compound, and the ammonium salt by using from about 4 percent to about 75 percent ammonium salt and from about 96 percent to about 25 percent rosin and organic acidic compound based on the total weight of the ammonium salt and the rosin and organic acidic compound on a dry basis.

All of the above-described sizing agents have a pH generally in the range of about 6.6 to about 10 and a total acidity of at least 1000 parts per million. This total acidity is measured as the amount of sodium hydroxide, expressed as equivalent parts by weight of calcium carbonate, required to impart a pink color to a million parts of phenolphthalein-containing sizing composition of the present invention, and may be determined by use of the Hach Chemical Company Total Acidity Test (Hach Chemical Co., Ames, Iowa, Model AC-5 Acidity Test Kit). The objective of each of the embodiments of the sizing agent of the present invention is to obtain the highest total acidity possible without lowering the pH to a level which makes the sizing agent insoluble in paper mill water. Thus, the proportions of the ingredients of the sizing compositions of the present invention vary in accordance with this objective and are thus conveniently defined in terms of the pH and total acidity they produce in the sizing agents.

The sizing composition may be employed as a pulp additive or as a surface sizing agent in the manufacture of cellulosive products. The exact amount to be used to produce optimum results will vary slightly, depending upon the type of pulp used and the desired properties of the finished product. Amounts generally less than those currently used with known sizing agents may generally be used to produce equivalent or superior products. Thus for example, while known rosin sizing agents are generally used in amounts from about 0.1 or 0.5 up to about 4.0% solids, based on the weight of fibers of the pulp slurry, the sizing compositions of this invention may be used in amounts as low as about 0.025% or 0.05%. Frequently, from about 0.05 or 0.25 up to about 4% of our sizing compositions, by dry weight based on the weight of fibers in the pulp slurry, may be used. Typically, where 1% of known rosin sizing agent is normally used, 0.50% of the novel agent of this invention can be used to obtain equivalent or superior results.

The compositions, products and methods of this invention are further illustrated by the following examples.

EXAMPLE 1

In the preparation of a specifically modified rosin, 3,360 grams of commercially available tall oil rosin, known as W-W Torex and sold by Reichold Chemical Co., is melted in a cooking vessel. To this rosin is added slowly with agitation 672 grams of fumaric acid. The reaction mixture, under continuous agitation, is then heated to about 205° C. and held at this temperature 2 to 4 hours. The mixture is then cooled and saponified by the addition of 700 grams of sodium hydroxide dissolved in 4032 grams of water. This amount of sodium hydroxide brings the pH of the product to about 10. The second component will be designated by the name Rosin 20.

EXAMPLE 2

The first component, i.e., the urea-Lewis acid reaction product, of the sizing agent is prepared by placing 4000 grams of urea, 200 grams of thionyl chloride ($SOCl_2$) and 4200 grams of water in a cooking vessel, subsequently applying heat while slowly agitating the contents until the reaction mixture boils at atmospheric pressure. When the temperature reaches about 103° C., the boiling stops, water loss ceases, and the pH of the solution, as determined by a pH meter, rises to about 8.

To form the sizing agent, the first component, Rosin 20, prepared in Example I, and water are mixed in approximately the following proportions:

| | |
|---|---|
| Rosin 20 | 115 grams |
| Water | 115 grams |
| First Component | 190 grams |
| TOTAL | 420 grams |

The resulting product is a sizing agent useful in both pulp additive and surface size systems.

EXAMPLE 3

In this example, the reaction between 200 grams of chlorosulfonic acid ($ClSO_3H$), 4,000 grams of urea, and 4,200 grams of water is completed according to the procedure substantially described in Example 2 to form the first component. The second component (Rosin 20) is made in accordance with the procedure of Example 1 using sodium hydroxide for the saponification reaction.

The first component and the Rosin 20 are mixed with water in the following proportions to yield an excellent sizing agent.

| | |
|---|---|
| Rosin 20 | 115 grams |
| Water | 115 grams |
| First Component | 190 grams |
| TOTAL | 420 grams |

EXAMPLE 4

The first component of this example is prepared by reacting 4,000 grams of urea, 200 grams of sulfuryl chloride ($SO_2Cl_2$), and 4,200 grams of water substantially by the procedure set forth in Example 2. The second component (Rosin 20) is made as described in Example 1 using sodium hydroxide as the saponyfing base.

An excellent sizing agent is made by mixing the first component, water, and Rosin 20 in the following proportions:

| | |
|---|---|
| Rosin 20 | 115 grams |
| Water | 115 grams |
| First Component | 190 grams |
| TOTAL | 420 grams |

EXAMPLE 5

The novel sizing agent of Example 4 is used as a pulp additive as follows: 100 grams of dry fiber is placed in a beater with about 5,000 grams of water to produce a 2% fiber stock. This slurryy is beaten until the pulp is dispersed uniformly in the water. Next 0.5 gram of the sizing agent of Example 4 is added while the slurry is being beaten. After the sizing agent has been beaten into the stock, 0.75 grams of papermaker's alum is added and thoroughly mixed into the solution. The mix of fiber, sizing agent, and alum is fed into a paper sheet former machine box and made into a mat which is pressed and dried to produce a sized finished paper product. The sizing agents of Examples 2 and 3 are employed in a similar manner.

EXAMPLE 6

To test the sizing agents of this invention, samples of the products of Examples 2, 3 and 4 are treated as follows:

The agents are mixed with papermaker's alum in bleached hardwood kraft to compare their performance. Handsheets are made using 2.8 grams of fiber diluted in water to a 1 weight percent slurry. The fiber and water are blended in a Waring blender for about one minute and then the sizing agents are added and mixed for about 45 seconds and then the alum is added. The sizing agent is added in the ratio of 10 pounds per ton of fiber. The alum is added in the amount of 15 pounds per ton of fiber. These slurries are then further diluted with water to a fiber solids content of about 0.05%, based on the weight of the slurry. Sheets are then formed with a Williams Handsheet Former from slurries made with each of the sizing agents of Examples 2, 3 and 4. The sheets are placed between two blotters and then dried in a hot press having a temperature of about 230° F. and exerting a pressure of about 50 pounds per square inch. The sheets are then conditioned for 24 hours at 50% relative humidity and 72° F. and tested. An ink float test, based on acid ink, is used to compare the effectiveness of the various sizing agents. The acid ink has the following composition:

1000 ml.: distilled water
5 g.: gallic acid
7.5 g.: $FeSO_4$
1.0 g.: tartaric acid
1.0 g.: sodium benzoate
3.5 g.: aniline blue
50.9 g.: formic acid The results obtained are tabulated in Table 1.

TABLE I

Test of Sizing Agents from Examples 2, 3 and 4

| Example No. | 2 | 3 | 4 |
|---|---|---|---|
| Alkali Used | NaOH | NaOH | NaOH |
| Reagent Reacted with Urea | $SOCl_2$ | $ClSO_3H$ | $SO_2Cl_2$ |
| Ink Float Results - Seconds | 45 | 60 | 65 |
| | 40 | 55 | 80 |
| | 30 | 50 | 55 |
| | 35 | 45 | 70 |
| | 35 | 55 | 80 |
| | 25 | 60 | 80 |
| | 30 | 65 | 55 |
| | 30 | 60 | 65 |
| | 30 | 45 | 50 |
| | 35 | 50 | 75 |
| Mean $X_n$ | 33.5 | 54.5 | 67.5 |
| Standard Deviation | 5.80 | 6.85 | 11.36 |

EXAMPLE 7

The first component of this sizing agent is prepared as follows. Three hundred grams of urea are mixed with 15 grams of chlorosulfonic acid in a suitable vessel which is placed in a water bath and heated for 2.5 hours at 100° C. The mixture is cooled and added to 315 grams of water. The resulting solution is heated with agitation until it boils at atmospheric pressure (about 103° C.). At this temperature the pH rises to a value of about 8.

The second component (Rosin 20) is prepared by substantially the same procedure described in Example 1.

To form the sizing agent, the first component, Rosin 20, and water are mixed in the following proportions:

| Rosin 20 | 115 grams |
|---|---|
| Water | 115 grams |
| First Component | 190 grams |
| TOTAL | 420 grams |

EXAMPLES 8, 9, 10 and 11

The first components of Examples 8, 9, 10 and 11 are prepared by treating urea with the indicated reactants using substantially the same procedure described in Example 7.

| Example | | Reactants-Grams |
|---|---|---|
| 8 | Urea-300 g | Benzenesulfonyl chloride-15 g $C_6H_5SO_2Cl$ |
| 9 | Urea-300 g | para-Toluenesulfonyl chloride-15 g $p\text{-}CH_3C_6H_4SO_2Cl$ |
| 10 | Urea-300 g | Thionyl chloride-15 g $SOCl_2$ |
| 11 | Urea-300 g | Sulfuryl chloride-15 g $SO_2Cl_2$ |

The sizing agents for Examples 8, 9, 10 and 11 are made by mixing the appropriate first component, water, and Rosin 20 in the following proportions.

| Rosin 20 | 115 grams |
|---|---|
| Water | 115 grams |
| First Component | 190 grams |
| TOTAL | 420 grams |

To test the sizing agents of Examples 7 through 11 inclusive, they are mixed with papermaker's alum in bleached hardwood kraft to compare their performance. Handsheets are made using 5.7 grams of fiber diluted to a one percent by weight slurry. The fiber and water are blended in a Waring blender for about one minute and the sizing agents are added and mixed for about 45 seconds followed by the alum. The sizing agent is added in the ratio of 10 pounds per ton of fiber while the alum is added in the amount of 15 pounds per ton of fiber.

The slurries are then further diluted with water to a fiber solids content of about 0.1%, based on the weight of the slurry. Sheets are then formed with a Williams Handsheet Former from the slurries made with the sizing agents of Examples 7, 8, 9, 10, and 11. The sheets are placed between two blotters and then dried in a hot press at a temperature of about 110° C. and under a pressure of about 50 pounds per square inch. The sheets are then conditioned for 24 hours at 50% relative humidity and 72° F. and tested by an ink float test.

In the ink float test a square of paper one inch on a side is placed on the surface of the liquid ink and the time is recorded for 50% of the surface to be colored by the ink. An acid ink is used in the tests reported in Table II and it has the following composition:

1000 ml: distilled water
5 g: gallic acid
7.5 g: $FeSO_4$
1.0 g: tartaric acid
1.0 g: sodium benzoate
3.5 g: aniline blue
50.9 g: formic acid

TABLE II

Test of Sizing Agents from Examples 7, 8, 9, 10, and 11

| Example No. | 7 | 8 | 9 | 10 | 11 |
|---|---|---|---|---|---|
| Reagent Reacted with Urea | $CSO_3H$ | $C_6H_5SO_2Cl$ | $CH_3C_6H_4SO_2Cl$ | $SOCl_2$ | $SO_2Cl_2$ |
| Ink Float Results-Seconds | 50 | 45 | 60 | 30 | 45 |
|  | 50 | 30 | 60 | 45 | 45 |
|  | 40 | 40 | 50 | 45 | 60 |
|  | 55 | 40 | 55 | 30 | 40 |
|  | 45 | 45 | 45 | 45 | 40 |
|  | 60 | 35 | 40 | 40 | 45 |
|  | 50 | 45 | 35 | 45 | 45 |
|  | 50 | 45 | 60 | 40 | 35 |
|  | 45 | 40 | 55 | 40 | 40 |
|  | 55 | 40 | 50 |  |  |
| Mean $\bar{X}n$ | 50.0 | 40.5 | 51.0 | 41.0 | 42.5 |
| Standard Deviation | 5.77 | 4.97 | 8.71 | 6.58 | 7.87 |

EXAMPLE 12

The first component of the sizing agent of Example 12 is prepared by placing 500 grams of urea, 25 grams of para-toluenesulfonic acid, and 525 grams of water in a cooking vessel and subsequently applying heat while slowly agitating the contents of the vessel until the reaction mixture boils at atmospheric pressure. When the pH of the reaction mixture rises to a value in the range of 8.0 to 8.5, the heating is discontinued and the contents of the vessel allowed to come to room temperature.

The second components (Rosin 20) of the reaction mixture is prepared by the method substantially described in Example 1.

To form the sizing agent, the first component, Rosin 20, and water are mixed in the following proportions:

| | |
|---|---|
| Rosin 20 | 115 grams |
| Water | 115 grams |
| First Component | 190 grams |
| | TOTAL 420 grams |

The resulting final product is an excellent sizing agent useful in both pulp additive and surface size systems.

EXAMPLE 13

The first component of the sizing agent of this example is made by substantially the same method described in Example 12 using the following proportions of ingredients:
Urea: 500 grams
p-$CH_3C_6H_4SO_3H$: 10 grams
Water: 510 grams To form the sizing agent, the first component, Rosin 20, and water are mixed in the following amounts:

| | |
|---|---|
| Rosin 20 | 115 grams |
| Water | 115 grams |
| First Component | 190 grams |
| | TOTAL 420 grams |

The resulting final product is an excellent sizing agent for both pulp additive and surface size systems.

EXAMPLE 14

The first component of this sizing agent is made by the method of Example 12 using the following proportions of ingredients:
Urea: 500 grams
p-$CH_3C_6H_4SO_3H$: 5 grams
Water: 505 grams The sizing agent is prepared by mixing Rosin 20, water, and first component in the following amounts:

| | |
|---|---|
| Rosin 20 | 115 grams |
| Water | 115 grams |
| First Component | 190 grams |
| | TOTAL 420 grams |

The resulting final product is an excellent sizing agent for both pulp additive and surface size systems.

EXAMPLE 15

The sizing agent of this example is prepared in substantially the same manner as that used for the sizing agent of Example 13.

EXAMPLE 16

The sizing agent of this example is prepared by substantially the same method as the one used for the sizing agent of Example 14.

EXAMPLE 17

To test the sizing agents of examples 12 through 16, inclusive, they are mixed with a papermaker's alum in bleached hardwood kraft to compare their performance. Handsheets are made using 2.8 grams of fiber diluted to a one percent by weight slurry. The fiber and water are blended in a Waring blender for about one minute and the sizing agents are added and mixed for about 45 seconds followed by the alum. The sizing agent is added in the ratio of 10 pounds per ton of fiber while the alum is added in the amount of 15 pounds per ton of fiber.

The slurries are then further diluted with water to a fiber solids content of about 0.05%, based on the weight of the slurry. Sheets are then formed with a Williams Handshheet Former from the slurries made with the sizing agents of Examples 12 to 16. The sheets are placed between two blotters and then dried in a hot press at a temperature of about 110° C. and under a pressure of about 50 pounds per square inch. The sheets are then conditioned for 24 hours at 50% relative humidity and 72° F. and tested by an ink float test.

In the ink float test a square of paper one inch on a side is placed on the surface of the liquid ink and the time is recorded for 50% of the surface to be colored by the ink. An acid ink is used in the tests reported in Table III and it has the following composition:
1000 ml.: distilled water
5 g.: gallic acid 7.5 g.: FeSO$_4$
1.0 g.: tartaric acid
1.0 g.: sodium benzoate
3.5 g.: aniline blue
50.9 g.: Formic acid

TABLE III

Test of Sizing Agents from Examples 12, 13, 14, 15 and 16
Sizing Agents Tested Two Hours After Preparation

| Ex. No. | 12 | 13 | 14 | 15 | 16 |
|---|---|---|---|---|---|
| Reagent Reacted with Urea (weight percent acid based on urea) | Toluene Sulfonic Acid-5% | Toluene Sulfonic Acid-2% | Toluene Sulfonic Acid-1% | Toluene Sulfonic Acid-2% | Toluene Sulfonic Acid-1% |
| Ink Float Results - Seconds | 60 | 55 | 105 | 70 | 75 |
|  | 85 | 65 | 90 | 100 | 80 |
|  | 90 | 80 | 90 | 90 | 115 |
|  | 75 | 70 | 75 | 75 | 90 |
|  | 60 | 100 | 85 | 70 | 100 |
|  | 50 | 75 | 80 | 85 | 70 |
|  | 60 | 100 | 85 | 75 | 85 |
|  | 60 | 100 | 85 | 85 | 100 |
|  | 50 | 75 |  | 95 | 75 |
|  | 50 | 95 |  | 130 | 100 |
| Mean $\bar{X}$ | 64.0 | 81.5 | 86.88 | 87.5 | 89.0 |
| Standard Deviation | 14.49 | 16.34 | 8.84 | 18.14 | 14.57 |

It is claimed:

1. A sizing composition comprising (a) the reaction product of urea and at least one Lewis acid selected from the group consisting of sulfuryl chloride, chlorosulfonic acid, thionyl chloride, benzenesulfonyl chloride, benzenesulfonic acid, ortho-toluenesulfonic acid, para-toluenesulfonic acid, ortho-toluenesulfonyl chloride and para-toluenesulfonyl chloride and (b) sizing effective amounts of rosin that is modified with from about 5 to 50 percent, based on weight of the rosin, of an organic acidic compound selected from the group consisting of an α, β-unsaturated aliphatic acid containing from about 3 to, 6 carbon atoms, an anhydride thereof, and their mixtures, wherein the amount of (a) is sufficient to provide the composition with a total acidity of at least about 1,000 parts per million.

2. The sizing composition of claim 1 wherein the Lewis acid is selected from the group consisting of sulfuryl chloride, chlorosulfonic acid, benzenesulfonyl chloride, benzenesulfonic acid, ortho-toluenesulfonic acid, para-toluenesulfonic acid, ortho-toluenesulfonyl chloride, and para-toluenesulfonyl chloride.

3. The sizing composition of claim 2 wherein the rosin is modified with an organic acidic compound selected from the group consisting of maleic acid, maleic anhydride, fumaric acid, and their mixtures.

4. The sizing composition of claim 3 wherein the rosin is tall oil rosin and is at least partially saponified.

5. The sizing composition of claim 4 wherein said rosin is modified with from about 9 to 30 percent of said organic acidic compound.

6. The sizing composition of claim 2 wherein (a) comprises from about 25 to about 85 weight percent and (b) comprises from about 75 to about 15 weight percent of their mixture on a dry weight basis.

7. The sizing composition of claim 6 wherein the Lewis acid reacted with the urea is from about 0.2 to about 8 percent based on the weight of the urea.

8. The sizing composition of claim 7 wherein the composition is an aqueous mixture.

9. The sizing composition of claim 8 wherein the composition contains at least about 25 weight percent water.

10. The sizing composition of claim 9 wherein the Lewis acid is para-toluenesulfonic acid or para-toluenesulfonyl chloride.

11. The sizing composition of claim 9 wherein additional ammonia is also contained in the composition in an amount sufficient to provide a pH of about 6.6 to about 10.

12. The sizing composition of claim 9 wherein additional ammonium salt is also contained in the composition in a weight ratio to the urea of about 4 to 1 to about 1 to 2.

13. The sizing composition of claim 12 wherein the additional ammonia salt is ammonium sulfate.

14. The sizing composition of claim 13 wherein the Lewis acid is para-toluenesulfonic acid.

15. The sizing composition of claim 9 which contains about 3 to 30 percent ammonia, from about 4 to 72 percent ammonium salt and from about 93 to 25 percent rosin and organic acidic compound, based on the total weight of the ammonia, the ammonium salt and the rosin and organic acidic compound on a dry basis, and using an ammonium salt to ammonia ratio greater than about 1 to 1.

16. The sizing composition of claim 15 wherein the ammonium salt comprises additional ammonium salt.

17. The sizing composition of claim 16 wherein the additional ammonium salt is ammonium sulfate and is in a weight ratio to urea of about 4 to 1 to about 1 to 2.

18. The sizing composition of claim 17 wherein the Lewis acid is para-toluenesulfonic acid.

19. The sizing composition of claim 15 wherein the Lewis acid is para-toluenesulfonic acid.

20. A sizing composition comprising an aqueous mixture containing about 3 to 30 percent ammonia; from about 4 to 72 percent ammonia salt, wherein at least a portion of said ammonia and ammonium salt are provided by the reaction product of urea with para-toluenesulfonic acid in an amount of about 0.2 to 8 weight percent of the urea; and from about 93 to 25 percent rosin modified with about 5 to 50 percent, based on the weight of rosin, with an organic acidic compound selected from the group consisting of maleic acid, maleic anhydride, fumaric acid, and their mixutres, said rosin being at least partially saponified, based on the total weight of the ammonia, the ammonium salt and the rosin and organic acidic compound on a dry basis, wherein the ratio of ammonium salt to ammonia is greater than about 1 to 1, the reaction product of the urea and Lewis acid comprises about 25 to 85 weight percent of the total of the reaction product and modified rosin, the total acidity is at least about 1000 parts per million, and the pH is about 6.6 to 10.

21. The sizing composition of claim 20 wherein the composition contains from about 40 to 60 weight percent water, and the rosin comprises tall oil rosin.

22. Paper sized with from about 0.05 to 4 percent by dry weight of the fibers of the sizing composition of claim 1.

23. The paper of claim 22 wherein the Lewis acid is selected from the group consisting of sulfuryl chloride, chlorosulfonic acid, benzenesulfonyl chloride, benzenesulfonic acid, ortho-toluenesulfonic acid, para-toluenesulfonic acid, ortho-toluenesulfonyl chloride, and para-toluenesulfonyl chloride.

24. The paper of claim 23 wherein the rosin is modified with an organic acidic compound selected from the group consisting of maleic acid, maleic anhydride, fumaric acid, and their mixtures.

25. The paper of claim 24 wherein the rosin is tall oil rosin and is at least partially saponified.

26. The paper of claim 23 wherein said rosin is modified with from about 9 to 30 percent of said organic acidic compound.

27. The paper of claim 26 wherein the Lewis acid reacted with the urea is from about 0.2 to about 8 percent based on the weight of the urea.

28. Paper sized with from about 0.05 to 4 percent by dry weight of the fibers of the sizing composition of claim 20.

29. A method for making a sizing agent comprising forming a first component by reacting urea and at least one Lewis acid selected from the group consisting of sulfuryl chloride, chlorosulfonic acid, thionyl chloride, benzenesulfonyl chloride, benzenesulfonic acid, ortho- or para-toluenesulfonic acid, and ortho- or para-tolenesulfonyl chloride, said Lewis acid being reacted in an amount sufficient to produce a reaction product having a total acidity of at least about 1000 parts per million; forming a second component by modifying rosin with from about 5 to 50 percent, based on the weight of the rosin, of an organic acidic compound selected from the group consisting of an $\alpha,\beta$-unsaturated aliphatic acid containing from about 3 to 6 carbon atoms, an anhydride thereof, and their mixtures, at a temperature between about 212° F. and 550° F., and forming a soap of said rosin before, during, or after said modifying; and providing a mixture of said first component and said second component containing from about 25 to 85 percent, based on the total dry weight, of the first component reaction product and from about 75 to 15 percent, based on the total dry weight, of the second component.

30. The method of claim 29 wherein the first component and the second component are separately prepared and are mixed.

31. The method of claim 30 wherein said rosin is modified with an organic acidic compound selected from the group consisting of maleic acid, maleic anhydride, fumaric acid, and their mixtures and the urea is reacted with at least one Lewis acid selected from the group consisting of sulfuryl chloride, chlorosulfonic acid, benzenesulfonyl chloride, benzenesulfonic acid, ortho- or para-toluenesulfonyl chloride, and ortho- or para-toluenesulfonic acid.

32. The method of claim 31 wherein said acid is para-toluenesulfonic acid and said total acidity is at least about 4,000 parts per million and the pH is basic.

33. The method of claim 31 wherein said soap is formed from said rosin by mixing said rosin with an aqueous solution of sodium hydroxide or potassium hydroxide.

34. The method of claim 31 wherein said rosin is modified with from about 9 to 30 weight percent of said organic acidic compound.

35. The method of claim 31 wherein the rosin is melted before it is modified with said organic acidic compound.

36. The method of claim 35 wherein said second component is cooled to room temperature by dilution with water before it is mixed with said first component.

37. The method of claim 31 wherein said first component is formed by reacting said urea at Lewis acid in the presence of from about 40 to 60 percent water, based on the total weight of the urea, Lewis acid, and the water.

38. The method of claim 31 wherein said second component is formed by modifying said rosin with said organic acidic compound in the presence of from 0 to 10 percent water, based on the total weight of the rosin, the organic acidic compound, and the water.

39. The method of claim 29 wherein said first component and said second component are formed and mixed in a single step.

* * * * *

UNITED STATES PATENT OFFICE
CERTIFICATE OF CORRECTION

Patent No. 4,141,750　　　　　　　　　　Dated February 27, 1979

Inventor(s) Ralph W. Emerson and Jerome L. Martin

It is certified that error appears in the above-identified patent and that said Letters Patent are hereby corrected as shown below:

Column 2, line 5, delete "resistance" and substitute therefor --resistant--.

Column 3, line 44, delete "lewis" and substitute therefor --Lewis--.

Column 8, line 66, delete "means" and substitute therefor --mean--.

Column 10, line 60, correct the spelling of "slurryy" to --slurry--.

Column 13, Table II, in Example No. 10, between the numbers 40 and 41.0 the number 50 was omitted.

Column 13, Table II, in Example No. 11, between the numbers 40 and 42.5 the number 30 was omitted.

Column 16, line 47, delete "mixutres" and substitute therefor --mixtures--.

Signed and Sealed this

Nineteenth Day of June 1979

[SEAL]

Attest:

RUTH C. MASON
Attesting Officer

DONALD W. BANNER
Commissioner of Patents and Trademarks